(12) United States Patent
Yan et al.

(10) Patent No.: US 8,674,847 B2
(45) Date of Patent: Mar. 18, 2014

(54) WIRELESS MONITOR VOICE INDICATION PARKING INDICATOR

(75) Inventors: Weiwen Yan, Guangzhou (CN); Desheng Li, Guangzhou (CN); Jun Luo, Guangzhou (CN)

(73) Assignee: Weiwen Yan, Guangzhou (CN)

( * ) Notice: Subject to any disclaimer, the term of this patent is extended or adjusted under 35 U.S.C. 154(b) by 691 days.

(21) Appl. No.: 12/745,137

(22) PCT Filed: Sep. 19, 2008

(86) PCT No.: PCT/CN2008/001626
§ 371 (c)(1),
(2), (4) Date: Oct. 7, 2010

(87) PCT Pub. No.: WO2009/067854
PCT Pub. Date: Jun. 4, 2009

(65) Prior Publication Data
US 2011/0199233 A1    Aug. 18, 2011

(30) Foreign Application Priority Data
Nov. 28, 2007  (CN) ............... 2007 2 0060489 U (51) Int. Cl.
*B60Q 1/48*    (2006.01)
(52) U.S. Cl.
USPC ............... 340/932.2; 340/691.6; 340/692

(58) Field of Classification Search
USPC .......... 340/932.2, 901, 903, 435, 692, 691.6; 348/148; 701/300, 301
See application file for complete search history.

(56) References Cited

U.S. PATENT DOCUMENTS

| | | | | |
|---|---|---|---|---|
| 5,373,482 A * | 12/1994 | Gauthier | | 367/99 |
| 5,634,709 A * | 6/1997 | Iwama | | 362/492 |
| 6,106,121 A * | 8/2000 | Buckley et al. | | 359/839 |
| 7,230,524 B2 * | 6/2007 | Watanabe et al. | | 340/435 |
| 7,366,595 B1 * | 4/2008 | Shimizu et al. | | 701/301 |
| 7,592,928 B2 * | 9/2009 | Chinomi et al. | | 340/932.2 |
| 2002/0154007 A1 | 10/2002 | Yang | | |
| 2004/0080431 A1* | 4/2004 | White | | 340/932.2 |
| 2008/0079607 A1* | 4/2008 | Uemura | | 340/932.2 |

FOREIGN PATENT DOCUMENTS

| CN | 2392320 Y | 8/2000 |
|---|---|---|
| CN | 2756492 Y | 2/2006 |

* cited by examiner

*Primary Examiner* — Thomas Mullen
(74) *Attorney, Agent, or Firm* — The Webb Law Firm (57) ABSTRACT

A wireless monitor voice indication parking indicator includes a transmitting part and a receiving part. The transmitting part includes a camera, an ultrasonic transmitting circuit, an ultrasonic receiving circuit, a power circuit, a voice indication circuit, a video superimposed circuit, a wireless transmitting circuit and a Single-chip Microcomputer (SCM) processor. The receiving part includes a power circuit, a wireless receiving circuit, an audio separation circuit, a control magnification output circuit, an alarm and a monitor. The power circuit supplies necessary stable voltage.

9 Claims, 6 Drawing Sheets

WIRELESS MONITOR VOICE INDICATION PARKING INDICATOR

TECHNICAL FIELD

The present invention provides a kind of wireless monitor voice indication parking indicator, belongs to the field of car signal device, and especially refers to a car parking indicator.

BACKGROUND OF THE INVENTION

A blur on a rear-view while parking has always been a problem for drivers, especially under conditions of bad weather and narrow space for parking, and it is thus easy for a collision to occur. One kind of existing parking device uses detecting principles of ultrasonic transmitting and receiving. While reversing a car, a buzzer sounds and a nixie tube indicates the distance of an obstacle without specific conditions of the rear portion of the car and the orientation, size and shape of the obstacle behind the car. For another kind of existing parking device with a camera, drivers are able to know the condition of the rear portion of the car, but not the exact distance of the obstacle, and at the same time the camera has a dead angle. Both of the above parking devices only unilaterally help drivers reverse the car. While reversing the car, the drivers have to judge the distance between the rear portion of the car and the obstacle in a moment, and simultaneously they have to judge the orientation and shape of the obstacle, which increases the difficulty in driving. During installation, a signal emitting device at the rear of the car and a driver monitoring device at the front of the car need to be connected with wires from the back to the front of the car, which increases the difficulty of the installation.

SUMMARY OF THE INVENTION

The present invention aims at avoiding disadvantages of the existing technology and supplying a wireless monitor voice indicating orientation parking device with a simple circuit structure, stable performance, the signals disposing part and monitoring part transferred wirelessly, and convenience in installation and detection.

The purpose of this invention is reached by taking measures below. The invention is composed of a transmitting part and a receiving part. The transmitting part is composed of a camera, an ultrasonic transmitting circuit, an ultrasonic receiving circuit, a power circuit, a voice indication circuit, a video superimposed circuit, a wireless transmitting circuit and a Single-Chip Microcomputer (SCM) processor. While the receiving part is composed of a power circuit, a wireless receiving circuit, an audio separation circuit, a control magnification output circuit, an alarm and a monitor. The power circuit offers necessary stable voltage.

In the transmitting part, a built-in control program of the SCM processor sends supersonic impulse signals; through channel selection, the supersonic impulse signals are distributed by circulation to each ultrasonic sensor matching circuit; and through the ultrasonic sensor matching circuit, supersonic voltages are applied to ultrasonic sensors. Ultrasonic waves are sent by the ultrasonic sensors and reflected against some obstacles. The ultrasonic sensors receive and acquire electric signals which are magnified and selected by an operational amplification circuit and put out square waves to the SCM processor to deal with numerical values. The SCM processor scans by circulation every channel. In a circulation, the SCM processor processes received square-wave signals, changes analog signals into digital signals which are written to a buffer for operation and comparison, so that distances between the ultrasonic sensors and the obstacle are gained in the circulation and the distances between each ultrasonic sensor and the obstacle are compared to gain the shortest distance. According to orientation and distance, the SCM processor superimposes on video by the video superimposed circuit, and video signals with superimposed character are sent out to the wireless transmitting circuit to send out signals. At the same time, the SCM processor sends the calculated shortest distance and orientation indications to the voice indication circuit, and the voice indication circuit automatically sends out readable audio signals of distance and orientation and later sends to the wireless transmitting circuit to send out the signals.

The wireless receiving circuit of the receiving part separates from the audio separation circuit once it receives video signals and audio signals superimposed with number and orientation, and sends signals to the control magnification output circuit. The audio signals are sent out to the alarm or to an original audio magnifier of a car to reduce voice to indicate, and the video signals are sent to the monitor to reveal images.

When the driver reverses the car, the device of the invention is electrified and begins to operate. The driver can see images of the distance and orientation of the obstacle behind the car by the camera and the ultrasonic sensors. The video signals and the audio signals are gained respectively through the video superimposed circuit and the voice indication circuit. The signals are sent out by the wireless transmitting circuit, and after the wireless receiving circuit receives the signals, the video signals are sent to the monitor to display and the audio signals are sent to the alarm, which increases the driver's security and exactness while reversing the car.

The power circuit of the transmitting part is worked by the car battery, controls its work by a reverse gear, and sends out branch voltage after through stable frequency integrated circuit packages.

The ultrasonic transmitting circuit is made up of integrated circuit packages, dynatrons and resistors. The SCM processor works by resonance of an external crystal oscillator and sends out 40 KHz sonic signals and control signals. The sonic signals, through the dynatrons, are connected to a multi-channel optional switch integrated circuit package and one group of the ultrasonic sensors is selected to be open to send out supersonic impulse signals. The control signals of the SCM processor connect with the multi-channel optional switch integrated circuit package to make channel circle of the multi-channel optional switch integrated circuit package open and distribute the supersonic impulse signals to many ultrasonic sensors to send out in turn.

The ultrasonic receiving circuit is made up of integrated circuit packages. The ultrasonic sensors have functions of transmitting and receiving. The ultrasonic receiving circuit works in the way that the ultrasonic sensors receive signals reflected by the supersonic impulse signals against the obstacle. The signals are sent to the multi-channel optional switch integrated circuit package after wave filtering, and are sent out to the SCM processor after the operational amplification circuit selects frequencies, magnifies and reshapes the signals.

The voice indication circuit is made up of integrated circuit packages, resistors and capacitors. The SCM processor sends relevant indication signals to voice integrated circuit packages and speech signals that have been magnified are sent to a transmitting terminal of the wireless transmitting circuit on an output port.

The video superimposed circuit is made up of integrated circuit packages, resistors and capacitors. Camera signals that have been magnified are sent to the integrated circuit packages. The SCM processor connects with the integrated circuit packages and sends out signals of the distance and orientation of the obstacle to connect to the integrated circuit packages. The camera signals and the signals of the distance and orientation of the obstacle are disposed by the integrated circuit packages, and the distance and orientation of the obstacle are superimposed and displayed on the camera's video. The camera signals separate vertical and horizontal countdown signals from a vertical and horizontal countdown separation pattern composed of integrated circuit packages.

The wireless transmitting circuit is composed of integrated circuit packages, resistors and capacitors. The video signals and 1 KHz control signals sent by the SCM processor are connected to a video port and a left-right audio track input port of a wireless transmitter. Firstly the audio, video and control signals are magnified and limited on magnitudes, later separately connected to interior of the integrated circuit packages to pre-emphasis circuits and revise signals, and then sent to a mixing circuit to combine audio signals with video signals so that a fixed-frequency is generated and stabilized. The signals, after magnification of an internal mixing magnifier, wave filtering of external capacitors and inductors and magnification of a promoted output magnifying tube, are wirelessly transmitted by an antenna. The wireless transmitting circuit with 2.4G transmitting module is adopted.

The wireless receiving circuit is made up of integrated circuit packages, resistors and capacitors. Wireless signals enter from the antenna, and are magnified and sent to a wave filter. The mixed signals of audio and video are sent to the integrated circuit packages, and send channel indications after an integrated circuit package channel selector switch or the resistor controls frequencies. There are a built-in PHASE-LOCKED LOOP Circuit (PLL circuit), an auto-gain circuit and an intermediate frequency amplifying circuit in the integrated circuit packages. The function of the PLL circuit is to stabilize selected frequencies of the integrated circuit packages. After the first and second intermediate frequency magnification of the selected frequencies, the mixed signals of audio and video are filtered out and sent to a Surface Acoustic Wave (SAW) filter to filter waves, and after magnification are sent to a built-in harmonic of the integrated circuit packages to magnify. A PLL demodulator and the auto-gain circuit are to stabilize the magnified mixed signals of audio and video. The built-in PLL demodulator demodulates video signals and sends them to a line trap which the function is to eliminate interferences of voices on the video signals. The integrated circuit packages send out pure video signals to magnify and then send out standard video signals. The wireless receiving circuit with 2.4G receiving module is adopted.

The audio separation circuit is composed of integrated circuit packages, wave filters, resistors and capacitors. The integrated circuit packages demodulate audio signals and mixed signals to the wave filters to select audio signals. Then the signals are sent to the integrated circuit packages to demodulate and are magnified on audio after demodulation, and are magnified by a built-in magnifier of the integrated circuit packages to separate two-channel signal, and one is for audio transmission and the other one is for control signals.

The control magnification output circuit is composed of integrated circuit packages, resistors and capacitors. Control signals are magnified by an amplifying circuit and reduced to control outputs of the integrated circuit packages. The speech signals are magnified on power by an audio magnified integrated circuit package, and sent to a magnifier of the car or a horn. The video signals received by the wireless receiving circuit are restored to standard video signals and then sent to the integrated circuit packages. The integrated circuit package is an electronic selector switch. The video signals are connected to an output port to magnify the video by a video magnified integrated circuit package, and then sent out to the monitor to display. Here images of the monitor have the video with superimposition of orientation and distance sent by the transmitting part.

Each functional circuit of the present invention has a simple structure, stable performance, easy installation and detection. By functions of wireless transmitting and receiving of the transmitting part and the receiving part, safety of reversing the car is increased, and the present invention can be widely applied to every kind of cars.

DETAILED DESCRIPTION OF THE PREFERRED EMBODIMENTS

Figure 1A:
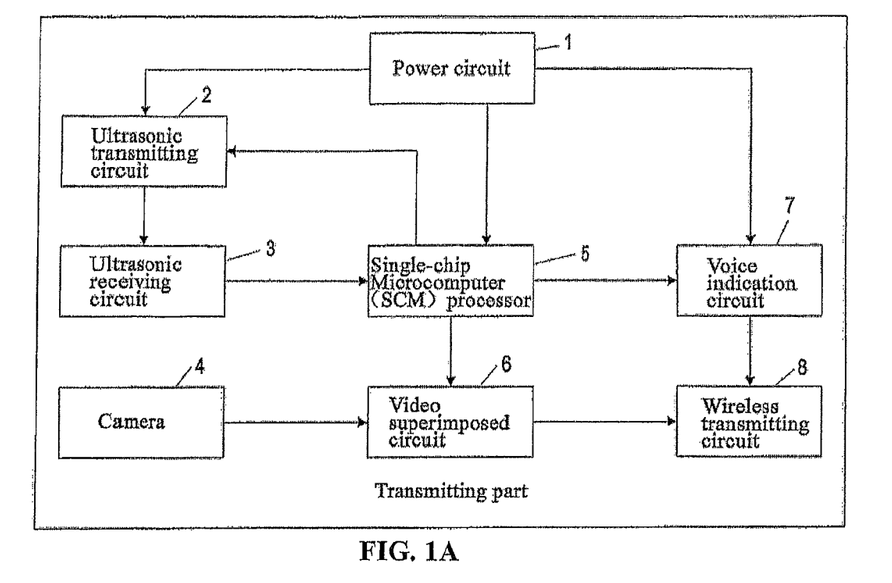
FIG. 1A is a schematic diagram of a transmitting part of the present invention.
Figure 1B:
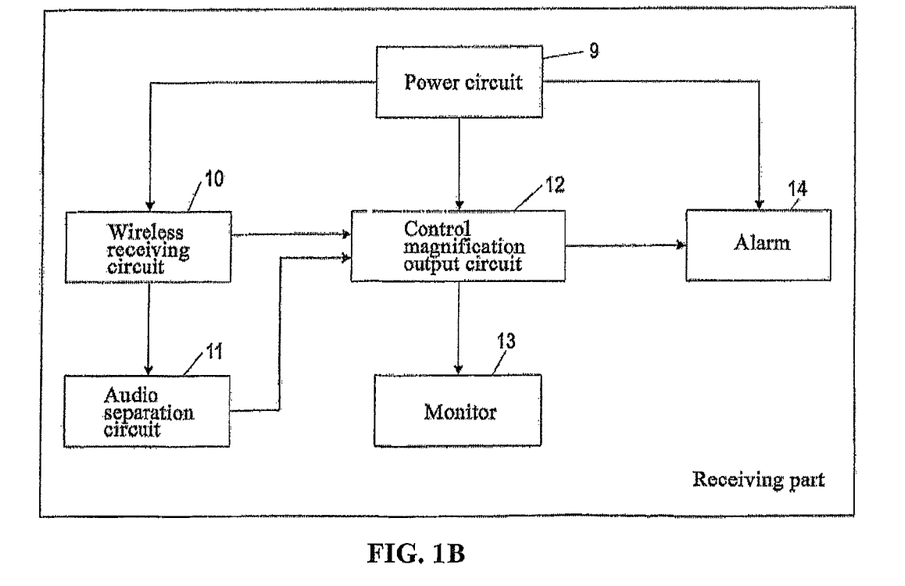
FIG. 1B is a schematic diagram of a receiving part of the present invention.

The embodiments of the present invention will be further explained below in detail with reference to the accompanying drawings. As shown in FIG. 1A and FIG. 1B, the present invention is made up of a transmitting part and a receiving part. The transmitting part is composed of a camera 4, an ultrasonic transmitting circuit 2, an ultrasonic receiving circuit 3, a power circuit 1, a voice indication circuit 7, a video superimposed circuit 6, a wireless transmitting circuit 8 and a Single-Chip Microcomputer (SCM) processor 5. The receiving part is composed of a power circuit 9, a wireless receiving circuit 10, an audio separation circuit 11, a control magnification output circuit 12, an ala 14 and a monitor 13. The power circuit supplies stable direct current, and the SCM processor 5 of the transmitting part timely sends supersonic impulse signals which are sent out by the ultrasonic transmitting circuit 2. Ultrasonic sensors receive signals reflected against an obstacle and acquire signals through the ultrasonic receiving circuit 3 to input the signals to the SCM processor 5. The SCM processor 5 calculates distances between the ultrasonic sensors and the obstacle by the received signals and compares distances between each ultrasonic sensor and the obstacle. Through the video superimposed circuit 6, numerical values of the distances and orientation calculated by the SCM processor 5 are superimposed on video signals. The video signals are sent to the wireless transmitting circuit 8 for wireless transmission, and at the same time, the SCM processor 5 also sends the calculated numerical values and orientation to the voice indication circuit 7 in the form of data. The voice indication circuit 7 restores a human voice for voice indication. Audio signals are also sent to the wireless transmitting circuit 8 for wireless transmission. By the wireless receiving circuit 10, the receiving part receives the superimposed video signals with distance and orientation, and the superimposed audio signals with indications of distance and orientation. By separating the audio signals from the audio separation circuit 11, the control magnification output circuit 12, after receiving signals, magnifies the audio and video, and sends signals to each amplifying circuit to amplify the signals. Magnified video signals are sent to the monitor 13 to display, and magnified audio signals are sent to a horn of the alarm or a power amplifier of a car to give an alarm while reversing the car. The wireless transmitting circuit with 2.4G transmitting module and the wireless receiving circuit with 2.4G receiving module are adopted.

Figure 2:
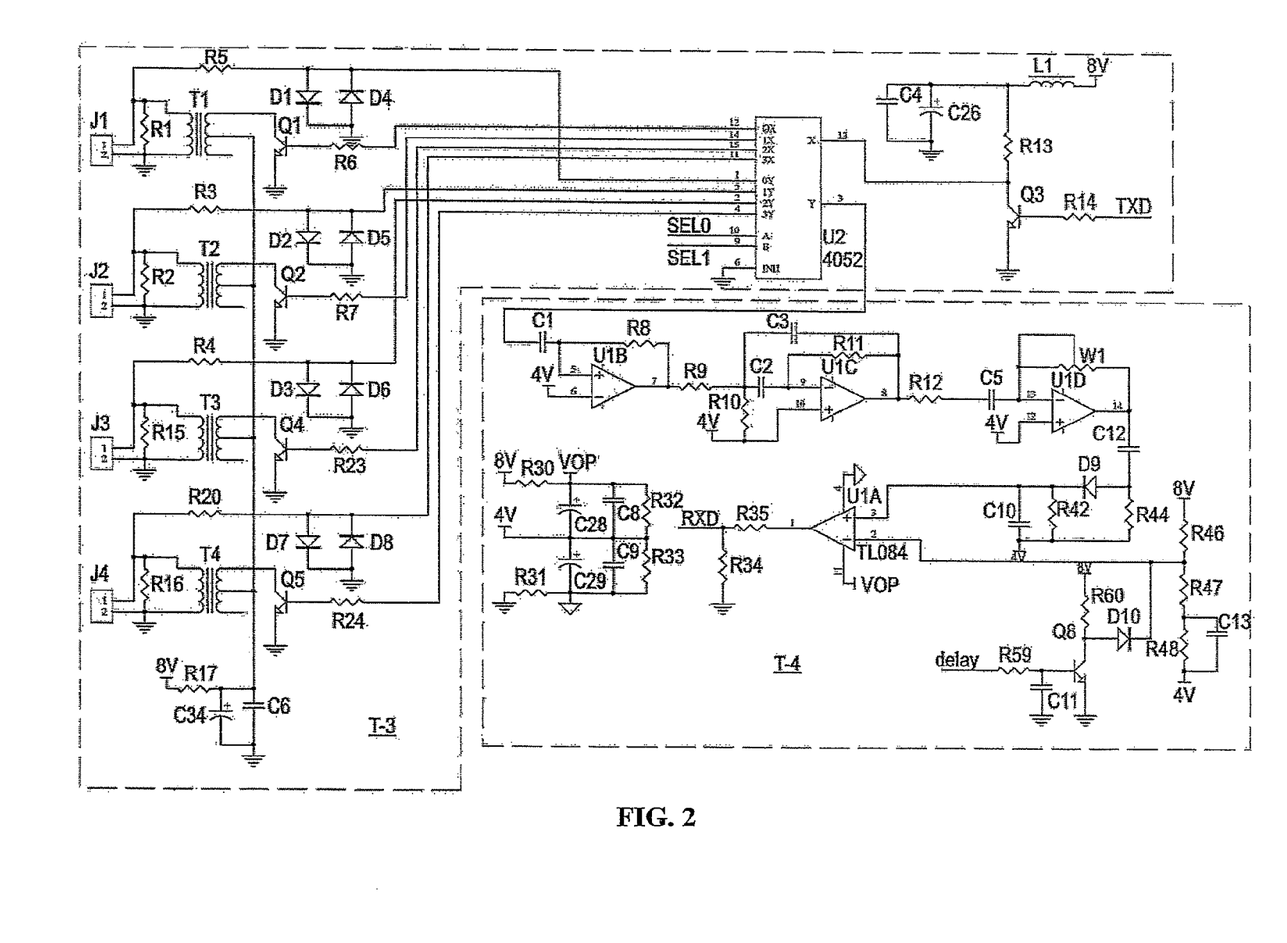
FIG. 2 is a schematic diagram of principle of the ultrasonic transmitting circuit and the ultrasonic receiving circuit of the present invention.

The ultrasonic transmitting circuit and the ultrasonic receiving circuit are shown in FIG. 2. As shown in T-4, the ultrasonic receiving circuit is made up of integrated circuit packages U2 (4052) and U1 (TL084), resistors and capacitors. The ultrasonic sensors have functions of transmitting and receiving. The ultrasonic receiving circuit works such that signals reflected against the obstacle by the supersonic impulse signals are received by four ultrasonic sensors J1, J2, J3 and J4. The signals, after being filtered by a diode, are sent to a multi-channel optional switch integrated circuit package U2 (4052), sent out by PIN 3 of the U2 (4052), and through frequency selection, magnification and shape disposal of an operational amplification circuit U1, then sent to the SCM processor U5. The first amplifying circuit, composed of U1B, R8, C1 and 4 volts frequency of 8 volts half-voltage, amplifies the signals and filters out low frequency signals. The second frequency selection amplifying circuit, composed of U1C, R10, R11, R12, C2 and C3, magnifies the signals and filters frequencies, and only allows 40 KHz ultrasonic frequency to pass through to gain further magnified electric signals. The third amplifying circuit, composed of U1D, C5 and an adjustable resistor W1, further magnifies the electric signals. Finally the magnified electric signals are sent to a comparison circuit which is composed of U1A, R42, R44, C10, C12 and D9, and after comparison, square waves are sent to the SCM processor U5. The adjustable resistor W1 adjusts magnified multiples of the amplifying circuits. As shown in T-3 of the FIG. 2, the ultrasonic transmitting circuit is composed of the integrated circuit package U2 (4052), dynatrons, an intermediate frequency transformer and resistors. The SCM processor U5 (PIC16F72) works by resonance of an external crystal oscillator and sends out 40 KHz sonic signals and control signals The sonic signals connect to PIN 13 of the multi-channel optional switch integrated circuit package U2 (4052) through the dynatron Q3, and selects to open one group of the ultrasonic sensors to discharge the supersonic impulse signals. The control signals of the SCM processor connect to PIN 10 and PIN 9 of the multi-channel optional switch integrated circuit package U2 (4052) to gain a configuration of electrical levels of the PIN 9 and the PIN 10 of the integrated circuit package U2 (4052), achieves opening channel circle of the multi-channel optional switch integrated circuit package U2 and distributes the supersonic impulse signals to the four ultrasonic sensors J1, J2, J3 and J4 to send out in turn.

Figure 3:
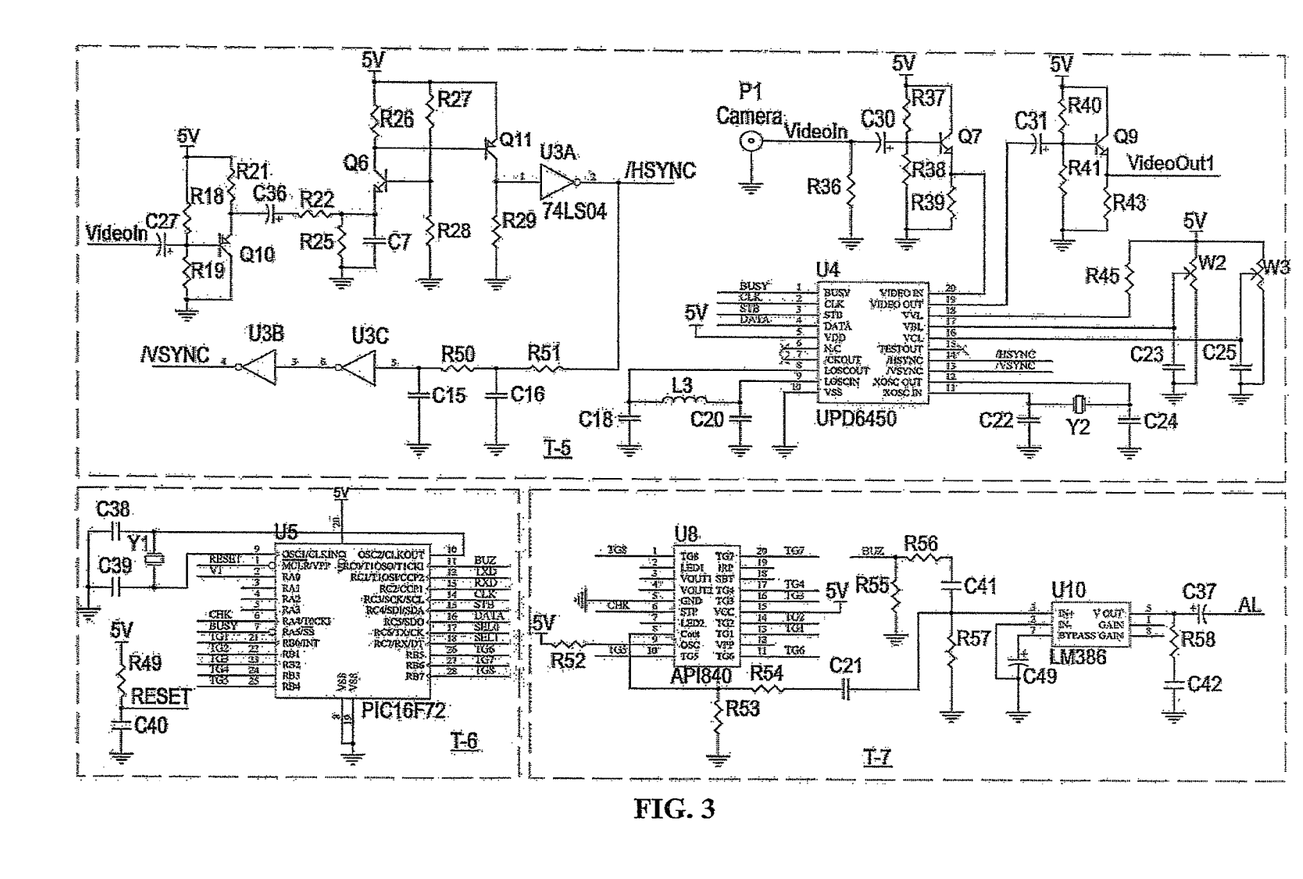
FIG. 3 is a schematic diagram of principle of the SCM processor, the video superimposed circuit and the audio indication circuit of the present invention.

The SCM processor, the video superimposed circuit and the voice indication circuit are shown in FIG. 3. As shown in T-7 of the FIG. 3, the voice indication circuit is composed of an integrated circuit package U10 (LM386), a voice integrated circuit package U8 (API840), resistors and capacitors. According to the orientation and distance of the obstacle, the SCM processor U5 (PIC16F72) sends relevant indication signals to the voice integrated circuit package U8 (API840). Speech signals are magnified by the magnifier integrated circuit package U10 (LM386) and sent to a transmitting port of a wireless transmitter on an output port. The speech signals are discharged from PIN 8 of the integrated circuit package U8 (API840), connected to PIN 3 of the integrated circuit package U10 through R54 and C21, magnified and disposed by the integrated circuit package U10 and connected to a wireless transmitting port by C37. PIN 11 of the SCM processor U5 connects to R56, through R55, R57, C41 and U10, pursuant to distances, the SCM processor discharges bleeps or sounds in different frequencies to the PIN 3 of the magnifier integrated circuit package U10, and the magnifier integrated circuit package U10(LM386) sends out magnified bleeps or sounds and audio signals mixed with voice. As shown in T-5 of the FIG. 3, the video superimposed circuit is composed of an integrated circuit package U3 (74LS04), an integrated circuit package U4 (UPD6450), resistors and capacitors. Through an electrolytic capacitor C27 and magnification of a dynatron Q7, signals of the camera P1 are sent to PIN 20 of the integrated circuit package U4 (UPD6450). PINs 7 14, 15 and 16 of the SCM processor U5 (PIC16F72) separately connect to PINs 1, 2, 3 and 4 of the U4 to control the integrated circuit package U4. PIN 16 of the SCM processor U7 (PIC16C62B) sends out signals of distance and orientation of the obstacle, and connects to the PIN 4 of the U4 and sends the signals to the U4. The signals of the camera P1 and the signals of the distance and orientation of the obstacle are disposed by the U4 and sent from PIN 19 of the U4 together, and through C31 and Q9, the distance and orientation of the obstacle are superimposed and displayed on the camera's video. The camera signals, through a vertical and horizontal countdown separation pattern constituted by an integrated circuit package U3 (74LS04), resistors and capacitors, send vertical and horizontal countdown signals from PIN 2 of the U3 (74LS04) to PIN 14 of the U4, and from PIN 6 of the U3 (74LS04) to PIN 13 of the U4. Crystal oscillators Y2, C22 and C24 offer clock pulse signals to the U4. Adjustable resistors R45, W2 and W3 revise the numerical distance and orientation indication of the obstacle displayed on the monitor and the video signals of character information with superimposed number and orientation are acquired.

Figure 4:
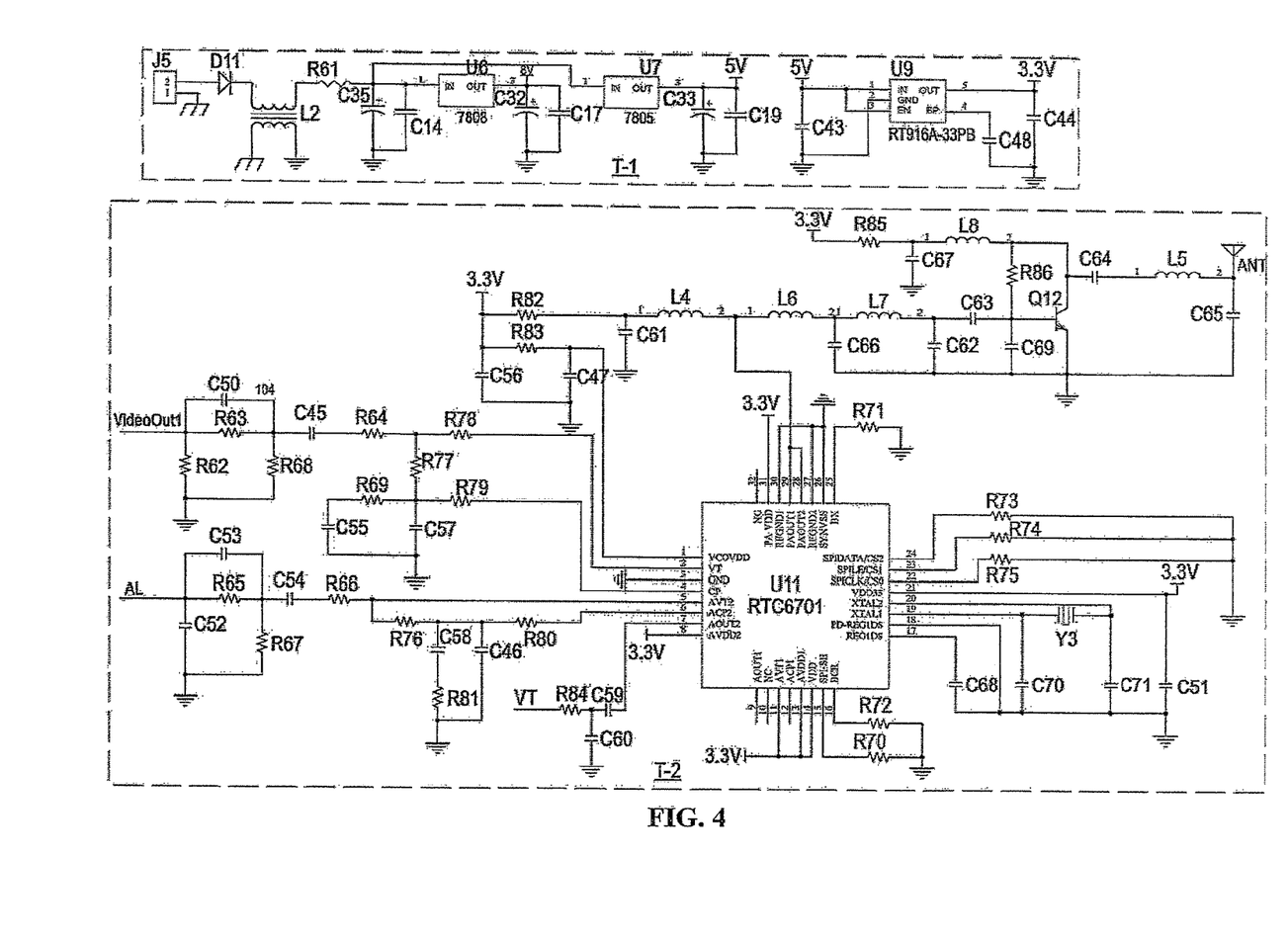
FIG. 4 is a schematic diagram of principle of the power circuit of the transmitting part and the wireless transmitting circuit of the present invention.

The power circuit and the wireless transmitting circuit of the transmitting part are shown in FIG. 4. As shown in T-1 of the FIG. 4, the power circuit of the transmitting part is composed of integrated voltage-regulator tubes, inductors and capacitors. A car battery inputs and controls its work by a reverse gear. After power on, through diodes, filters of inductors and capacitors, and through a stable integrated circuit package U6 (7808), the car battery puts out 8 volts branch voltage; through a stable integrated circuit package U7 (7805), the car battery puts out 5 volts branch voltage; and through a stable integrated circuit package U9 (RT916A-33PB), the car battery puts out 3.3 volts branch voltage. As shown in T-2 of the FIG. 4, the wireless transmitting circuit is composed of an integrated circuit package U11 (RTC6701), resistors and capacitors. The wireless transmitting circuit with 2.4G transmitting module is adopted. Loaded bleeps sounds and voice-mixed audio signals AL, video signals VideoOut1 with superimposed number and orientation and 1 KHz control signals VT sent by the SCM processor are connected to a video port and a left-right audio track input port of the wireless transmitter to filter the audio, video and control signals and limit magnitudes, then respectively connected to PINs 2, 4, 5, 6 and 7 of the integrated circuit package U11 (RTC6701) to pre-emphasize circuits and revise the signals in the integrated circuit package U11 (RTC6701), and later sent to a mixing circuit where the audio signals combine with the video signals. The functions of pre-emphasis and frequency mixing concentrate in the integrated circuit package U11 (RTC6701), and frequencies of a crystal resonator Y3 are selected and controlled by resistors R73, R74 and R75 to reach generation and stabilization of a fixed-frequency. The signals, after magnification of an internal mixing magnifier of the U11 (RTC6701), wave filtering of external inductors and capacitors and magnification of a promoted output magnifying tube Q12, are wirelessly transmitted by the antenna ANT.

Figure 5:
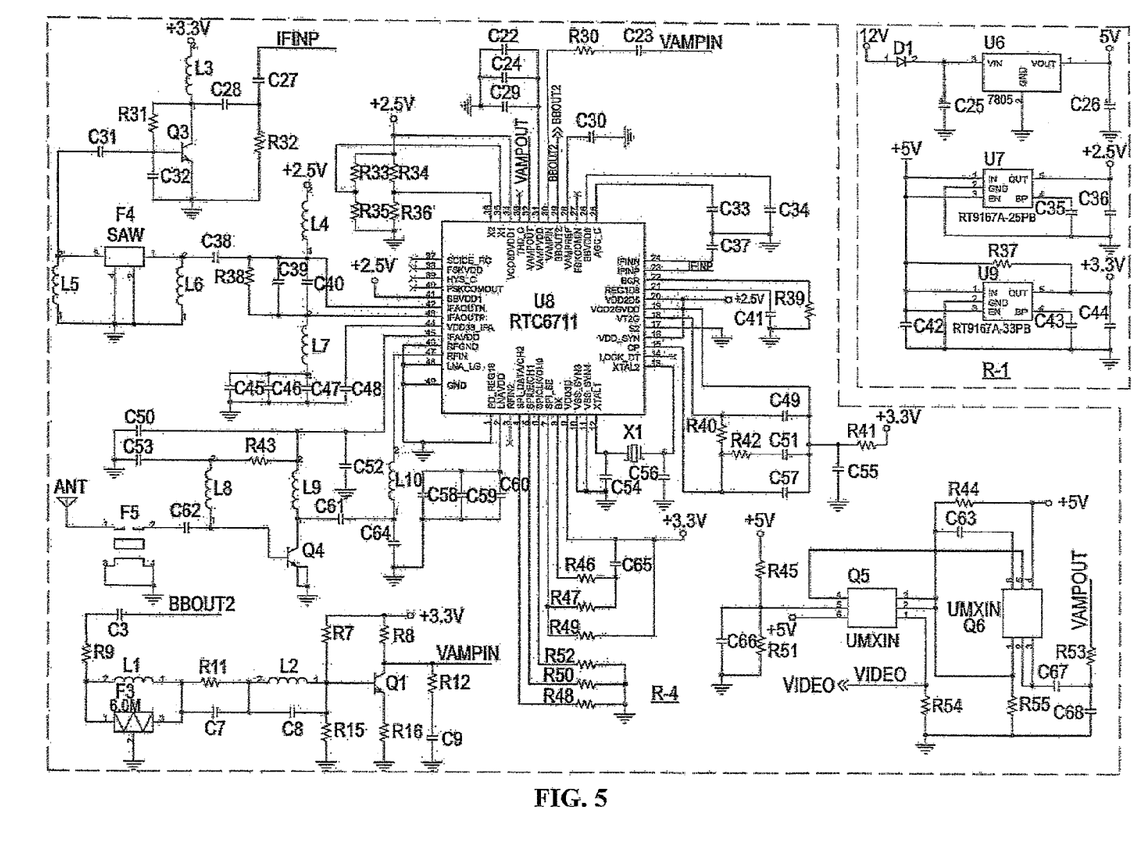
FIG. 5 is a schematic diagram of principle of the power circuit of the receiving part and the wireless receiving circuit of the present invention.

The power circuit and the wireless receiving circuit of the receiving part are shown in FIG. 5. As shown in R-1 of the FIG. 5, the power circuit of the receiving part is composed of integrated circuit packages U6 (7805), U7 (RT9167A-33PB), U9 (RT9167A-2.5PB) and capacitors. The power is input by the car battery, protected by a diode D1, gains 5 volts from the integrated circuit package U6 (7805), 3.3 volts voltage from the integrated circuit package U7 (RT9167A-33PB) and 2.5 volts voltage from the integrated circuit package U9 (RT9167A-2.5PB), and then gains necessary voltage by wave filtering of capacitors.

As shown in R-4 of the FIG. 5, the wireless receiving circuit is composed of an integrated circuit package U8 (RTC6711), antennas, dynatrons, inductors, resistors and capacitors. The wireless receiving circuit with 2.4G receiving module is adopted. 2.4G wireless signals enter from the antenna ANT, and after reception of a built-in antenna F5 with low noise and high sensitivity and the first magnification by Q4, are sent to a wave filter. The signals, as mixed signals of audio and video, are sent to the integrated circuit package U8 (RTC6711), controlled frequencies by an external channel selector switch of PINs 4, 5 and 6 of the U8 (RTC6711) or resistors of R48, R50 and R52, and send out channel indications. The integrated circuit package U8 (RTC6711) has a built-in PHASE-LOCKED LOOP Circuit (PLL circuit), an auto-gain circuit and an intermediate frequency amplifying circuit. The function of the PLL circuit is to stabilize frequencies selected by the integrated circuit package U8 (RTC6711). According to the first and the second intermediate frequency magnification of selected frequencies, the mixed signals of audio and video that have been filtered are sent from PIN 42 and PIN 43 of the integrated circuit package U8 (RTC6711) to a Surface Acoustic Wave filter to filter waves. The gained mixed signals are magnified by Q3 and put in a built-in harmonic of PIN 23 of the U8 (RTC6711) to magnify again. A PLL demodulator and the auto-gain circuit are used to stabilize the magnified mixed signals of audio and video. The built-in PLL demodulator demodulates video signals and sends them to a dynatron Q1 to limit 6.0M/6.5M waves by a capacitor C3 and inductors L1, L2, F3, C7 and C8 from PIN 29 of the U8 (RTC6711) to eliminate interferences of voices on the video signals, and later reflects signals to PIN 30 of the U8 (RTC6711). Then PIN 32 of the integrated circuit package U8 (RTC6711) puts out pure video signals to integrated circuit packages Q5 and Q6 for magnifying video signals, and then puts out standard video signals.

Figure 6:
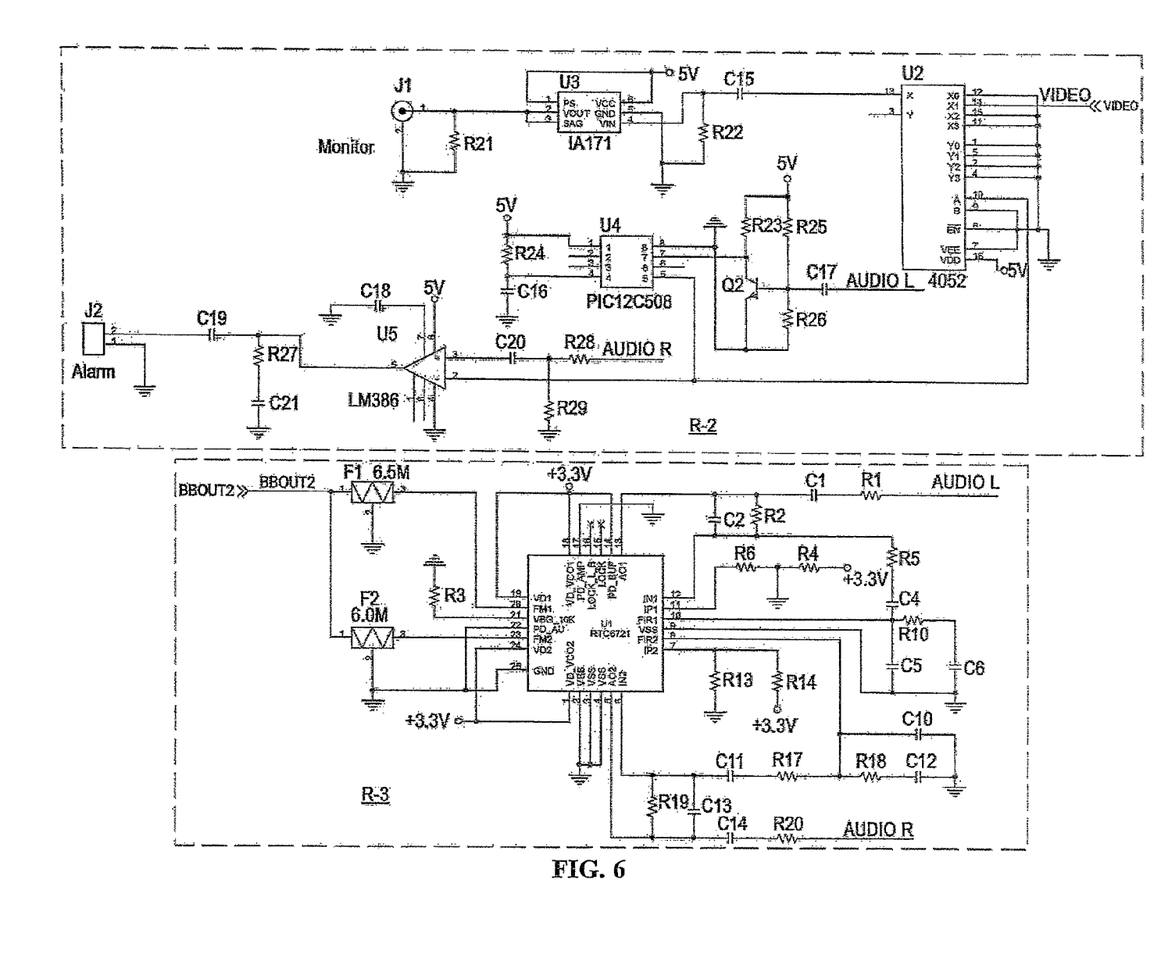
FIG. 6 is a schematic diagram of principle of the audio separation circuit and the control magnification output circuit of the present invention.

The audio separation circuit and the control magnification output circuit are shown in FIG. 6. As shown in R-3 of the FIG. 6, the audio separation circuit is composed of an integrated circuit package U1 (RTC6721), wave filters, resistors and capacitors. The integrated circuit package U8 (RTC6711) demodulates and sends audio signals and mixed signals from the PIN 29 to the wave filters of F1 (6.0M) and F2 (6.5M) to select audio signals, and then sends to the integrated circuit package U1 (RTC6721) to demodulate. After demodulation, signals are magnified on audio, magnified by a built-in magnifier of the U1 (RTC6721) and separated to two-channel signal, and one is for voice transmission, and the other one is for control signals to connect to the circuit shown in R-2 of the FIG. 6.

As shown in the R-2 of the FIG. 6, the control magnification output circuit is composed of an integrated circuit package U2 (4052), an integrated circuit package U4 (PIC12C508), an integrated circuit package U5 (LM386), dynatrons, resistors and capacitors. The control signals are connected to an amplifying circuit that is constituted by the dynatron Q2 through a capacitor C17 to be magnified and restored, and then connected to the integrated circuit package U4 (PIC12C508) which has been written to program. If input signals are 1 KHz, PIN 5 of the integrated circuit package U4 will send out electrical level with low frequency to control outputs of the integrated circuit packages U2 and U5. Speech signals, through resistor R28 and capacitor C20, connect to the audio magnified integrated circuit package U5 (LM386) to magnify power with the condition that there must be electrical level with low frequency which is sent by the integrated circuit package U4 connecting to PIN 2, and then speech signals are sent to the magnifier of the car or the horn, when the audio signals transmitted by the transmitting part are sent out and the distance is read out. Video signals received by the wireless receiving circuit, after reverted to standard video signals, are sent to the integrated circuit package U2 (4052). The integrated circuit package is an electronic selector switch. When the electrical level with low frequency of the integrated circuit package U4 is sent to PIN 10 of the U2 (4052), the video signals are connected to the output port and sent out by PIN 13, and connected to PIN 4 of a video magnified integrated circuit package U3 by the capacitor C15 to magnify the video, and then sent to the monitor to display through PIN 2 and PIN 3. Then images of the monitor have contained the video with superimposed orientation and distance sent by the transmitting part.

Each functioned circuit of the present invention has a simple structure, stable performance, convenience in installation and detection. By showing conditions of the rear portion of the car through the monitor, and reading out the distance and orientation of the obstacle by voice, safety is increased while reversing the car and the present invention can be widely applied to every kind of car.

The invention claimed is:

1. A wireless monitor voice indication parking indicator comprising:

a transmitting part comprising a Single-Chip Microcomputer (SCM) processor operatively coupled to a camera, an ultrasonic receiving circuit, an ultrasonic transmitting circuit having a plurality of ultrasonic sensors, a plurality of ultrasonic sensor matching circuits, and a plurality of channels, a power circuit, a voice indication circuit, a video superimposed circuit, and a wireless transmitting circuit; and a receiving part configured to communicate with the transmitting part, the receiving part comprising a power circuit, a wireless receiving circuit, an audio separation circuit, a control magnification output circuit, an alarm, and a monitor, wherein a built-in control program of the SCM processor of the transmitting part causes output of supersonic impulse signals, the SCM processor selects said channels in the ultrasonic transmitting circuit in a continuous sequence, and assigns the supersonic impulse signals to each ultrasonic sensor matching circuit corresponding to a respective one of the channels in the ultrasonic transmitting circuit, and by the ultrasonic sensor matching circuits, the supersonic impulse signals are sent to ultrasonic sensors corresponding to the ultrasonic sensor matching circuits;

the ultrasonic sensors responsive to the supersonic impulse signals output ultrasonic waves and acquire electric signals received by the ultrasonic sensors when the ultrasonic waves encounter an obstacle and reflect off the obstacle;

an operational amplification circuit in the ultrasonic receiving circuit performs frequency selection and magnification for the electric signals, and the operational amplification circuit sends square waves to the SCM processor;

the SCM processor in a continuous sequence scans every channel of the ultrasonic transmitting circuit, and in the continuous sequence, the SCM processor processes received square-wave signals by changing the square-wave signals from analog signals into digital signals, and writes the digital signals into a buffer to calculate and compare distances between the ultrasonic sensors and the obstacle in the continuous sequence to acquire a shortest distance;

the SCM processor superimposes an orientation of the obstacle and the shortest distance on video signals from a video shot by the camera through the video superimposed circuit, thereby producing video signals with the superimposed shortest distance and orientation, on the basis of the shortest distance between the ultrasonic sensors and the obstacle and the orientation of the obstacle, the video signals with the superimposed shortest distance and orientation are sent to the wireless transmitting circuit and the wireless transmitting circuit outputs the video signals with the superimposed shortest distance and orientation;

the SCM processor sends indications of the shortest distance and the orientation to the voice indication circuit, the voice indication circuit outputs audio signals capable of reporting the shortest distance and the orientation and sends the audio signals to the wireless transmitting circuit, and the wireless transmitting circuit outputs the audio signals; and the wireless receiving circuit of the receiving part receives the video signals with the superimposed shortest distance and orientation and the audio signals, separates the video signals with the superimposed shortest distance and orientation and the audio signals through the audio separation circuit, sends the video signals with the superimposed shortest distance and orientation and the audio signals to the control magnification output circuit, and sends the audio signals to the alarm and the video signals with the superimposed shortest distance and orientation to the monitor to display.

2. The wireless monitor voice indication parking indicator according to claim 1, wherein the ultrasonic transmitting circuit comprises a multi-channel optional switch integrated circuit package, dynatrons, and resistors;

the SCM processor responsive to resonance of a crystal oscillator connected to the SCM processor sends sonic signals and control signals to the multi-channel optional switch integrated circuit package, the sonic signals are sent to the multi-channel optional switch integrated circuit package through one of the dynatrons, a channel of the multi-channel optional switch integrated circuit package is selected to be open to cause one of the ultrasonic sensors corresponding to the selected channel to output the supersonic impulse signals, and the control signals are sent to the multi-channel optional switch integrated circuit package so that the channels of the multi-channel optional switch integrated circuit package are opened in a continuous sequence, and through the multi-channel optional switch integrated circuit package, the SCM processor distributes the supersonic impulse signals in turn to the ultrasonic sensors to output the supersonic impulse signals;

the ultrasonic receiving circuit operates such that the ultrasonic sensors receive signals when the supersonic impulse signals encounter the obstacle and reflect off of the obstacle, the reflected signals are sent to the multi-channel optional switch integrated circuit package after being frequency filtered, and are sent to the SCM processor after the operational amplification circuit in the ultrasonic receiving circuit selects frequencies, magnifies and reshapes the reflected signals.

3. The wireless monitor voice indication parking indicator according to claim 1, wherein the SCM processor sends signals to a voice integrated circuit package based on the shortest distance between the ultrasonic sensors and the obstacle and the orientation of the obstacle; the voice integrated circuit package outputs the audio signals based on the signals based on the shortest distance and the orientation; and the audio signals, after being magnified, are sent to a transmitting terminal of the wireless transmitting circuit on an output port.

4. The wireless monitor voice indication parking indicator according to claim 1, wherein the video superimposed circuit comprises an integrated circuit package, another integrated circuit package, dynatrons, resistors, and capacitors;

the video superimposed circuit configured to:

receive the video signals from the video shot by the camera, after being magnified by one of the dynatrons, at the other integrated circuit package;

the SCM processor is connected to the other integrated circuit package and sends the indications of the shortest distance and the orientation of the obstacle to the other integrated circuit package;

the video signals from the video shot by the camera and the indications of the shortest distance and the orientation of the obstacle are processed by the other integrated circuit package, and the shortest distance and the orientation of the obstacle are superimposed and displayed on the video signals from the video shot by the camera, thereby producing the video signals with the superimposed shortest distance and the orientation; and vertical and horizontal countdown signals in the video signals from the video shot by the camera are separated from the video signals from the video shot by the camera by a vertical and horizontal countdown separation pattern in the integrated circuit package.

5. The wireless monitor voice indication parking indicator according to claim 1, wherein the wireless transmitting circuit comprises an integrated circuit package, resistors, and capacitors, inductors and a promoted output magnifying tube;

the wireless transmitting circuit configured to:

receive control signals sent by the SCM processor, the audio signals and the video signals with the superimposed shortest distance and orientation at a video port and a left-right audio track input port of a wireless transmitter;

after being frequency filtered and amplitude limited, the audio signals, the video signals with the superimposed shortest distance and orientation and the control signals are separately connected to preemphasis circuits in the integrated circuit package to be processed, sent to a mixing circuit in the integrated circuit package, and mixed in the mixing circuit to form mixed signals; and the mixed signals are magnified by a mixing magnifier in the integrated circuit package and frequency filtered by the capacitors and the inductors, and magnified by the promoted output magnifying tube and transmitted wirelessly by an antenna.

6. The wireless monitor voice indication parking indicator according to claim 1, wherein the wireless receiving circuit comprises a frequency filter, an integrated circuit package, a Surface Acoustic Wave (SAW) frequency filter, a line trap, resistors, and capacitors;

mixed signals of the video signals with the superimposed shortest distance and orientation, the audio signals, and control signals sent by the SCM processor are received by an antenna of the wireless receiving circuit, and after magnification, are sent to the frequency filter;

the mixed signals are sent to the integrated circuit package;

a Phase-Locked Loop Circuit (PLL circuit), an auto-gain circuit and an intermediate frequency amplifying circuit are arranged in the integrated circuit package, such that the intermediate frequency amplifying circuit, through first and second intermediate frequency magnification, filters out the mixed signals and sends the filtered out mixed signals to the SAW frequency filter to filter frequencies, and after magnification, the frequency filtered and magnified mixed signals are sent to a harmonic magnification, PLL demodulator, and auto-gain circuit in the integrated circuit package;

the PLL demodulator and the auto-gain circuit are configured to stabilize the magnified mixed signals, and the PLL demodulator demodulates the video signals and sends the demodulated video signals to the line trap; and the integrated circuit package outputs the video signals to magnify the video signals, and the video signals with the superimposed shortest distance and orientation are restored.

7. The wireless monitor voice indication parking indicator according to claim 1, wherein the audio separation circuit comprises an integrated circuit package, frequency filters, resistors, and capacitors;

another integrated circuit package demodulates the audio signals from mixed signals of the video signals with the superimposed shortest distance and orientation, the audio signals, and control signals sent by the SCM processor and sends the demodulated signal to the frequency filter to select the audio signals, and the audio signals are sent to the integrated circuit package to demodulate, thereby producing demodulated signals;

after demodulation, the demodulated audio signals are magnified; and after magnification by a magnifier in the integrated circuit package, the audio signals are separated into two-channel signals, wherein one channel of the two channel signals is for voice transmission and the other channel of the two channel signals is for control signals of the SCM processor.

8. The wireless monitor voice indication parking indicator according to claim 1, wherein the control magnification output circuit comprises an audio magnified integrated circuit package, a video magnified integrated circuit package, resistors, and capacitors;

the control magnification output circuit configured to:

amplify power of the audio signals by the audio magnified integrated circuit package and send the amplified audio signals to the alarm;

restore the video signals received by the wireless receiving circuit and send the video signals to the video magnified integrated circuit package; and the video signals are magnified by the video magnified integrated circuit package and sent to the monitor to display.

9. The wireless monitor voice indication parking indicator according to claim 1, wherein the wireless transmitting circuit includes a 2.4G transmitting module and the wireless receiving circuit includes a 2.4G receiving module.

* * * * *

UNITED STATES PATENT AND TRADEMARK OFFICE
CERTIFICATE OF CORRECTION

PATENT NO. : 8,674,847 B2  Page 1 of 1
APPLICATION NO. : 12/745137
DATED : March 18, 2014
INVENTOR(S) : Yan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 823 days.

Signed and Sealed this
Twenty-ninth Day of September, 2015

Michelle K. Lee
*Director of the United States Patent and Trademark Office*